(12) United States Patent
Faber et al.

(10) Patent No.: US 11,274,643 B2
(45) Date of Patent: Mar. 15, 2022

(54) MAINTENANCE SYSTEM (71) Applicant: DELPHI TECHNOLOGIES IP LIMITED, St. Michael (BB)

(72) Inventors: Guillaume Faber, Blois (FR); Stephane Belsoeur, Villefrancoeur (FR)

(73) Assignee: DELPHI TECHNOLOGIES IP LIMITED

( * ) Notice: Subject to any disclaimer, the term of this patent is extended or adjusted under 35 U.S.C. 154(b) by 170 days.

(21) Appl. No.: 16/617,218

(22) PCT Filed: May 25, 2018

(86) PCT No.: PCT/EP2018/063842
§ 371 (c)(1),
(2) Date: Nov. 26, 2019

(87) PCT Pub. No.: WO2018/219829
PCT Pub. Date: Dec. 6, 2018

(65) Prior Publication Data
US 2021/0123405 A1 Apr. 29, 2021

(30) Foreign Application Priority Data

May 31, 2017 (FR) ...................................... 1754808

(51) Int. Cl.
*G01F 1/72* (2006.01)
*F02M 65/00* (2006.01)
*F02D 41/22* (2006.01)

(52) U.S. Cl.
CPC ........ *F02M 65/001* (2013.01); *F02M 65/003* (2013.01); *F02D 41/221* (2013.01); *F02D 2041/225* (2013.01); *F02D 2200/0602* (2013.01); *F02M 65/008* (2013.01); *F02M 2200/24* (2013.01)

(58) Field of Classification Search
None
See application file for complete search history.

(56) References Cited

U.S. PATENT DOCUMENTS

| | | | | |
|---|---|---|---|---|
| 7,370,520 B2* | 5/2008 | Kortsen | ................. | F02M 65/00 73/114.51 |
| 8,551,260 B2* | 10/2013 | Horriat | ................. | F02M 65/007 134/22.1 |
| 9,097,226 B2* | 8/2015 | Cueto | .................... | F16L 41/00 |
| 9,390,565 B2* | 7/2016 | Thompson | ............ | G01M 3/226 |

(Continued)

FOREIGN PATENT DOCUMENTS

DE 102007039793 A1 2/2009
DE 102010025177 A1 12/2011

*Primary Examiner* — Freddie Kirkland, III
(74) *Attorney, Agent, or Firm* — Joshua M. Haines (57) ABSTRACT

The invention relates to a maintenance system for a fuel injection system provided in an internal combustion engine, the fuel injection system defining a hydraulic circuit having a high-pressure pump, a solenoid valve, a pressure sensor, a metering solenoid valve, a common rail and injectors. The maintenance system includes a manual control unit connected to a hydraulic unit, the hydraulic unit being capable of being inserted into the hydraulic circuit of the fuel injection system and including a test solenoid valve and a test pressure sensor mounted in a body provided with an inlet mouth, an outlet mouth and a leakage mouth.

10 Claims, 9 Drawing Sheets

(56) References Cited

U.S. PATENT DOCUMENTS

| | | | |
|---|---|---|---|
| 9,567,936 B2* | 2/2017 | Moonjelly | F02M 65/003 |
| 9,624,887 B2* | 4/2017 | Belsoeur | F02M 65/001 |
| 9,851,019 B2* | 12/2017 | Shields | F16K 37/0083 |
| 2013/0031775 A1 | 2/2013 | Cueto | |
| 2014/0257721 A1* | 9/2014 | Thompson | G01M 3/226 |
| | | | 702/51 |
| 2015/0034125 A1 | 2/2015 | Belsoeur et al. | |
| 2016/0010584 A1 | 1/2016 | Moonjelly et al. | |

* cited by examiner

MAINTENANCE SYSTEM

CROSS REFERENCE TO RELATED APPLICATIONS

This application is a national stage application under 35 USC 371 of PCT Application No. PCT/EP2018/063842 having an international filing date of May 25, 2018, which is designated in the United States and which claimed the benefit of FR Patent Application No. 1754808 filed on May 31, 2017, the entire disclosures of each are hereby incorporated by reference in their entirety.

TECHNICAL FIELD

The invention relates to a system for maintaining and servicing the fuel injection system equipping internal combustion engines. The invention more particularly concerns a portable system enabling intervention without demounting the fuel injection system and a maintenance kit including a system of that kind.

TECHNOLOGICAL BACKGROUND OF THE INVENTION

Maintaining the injection system equipping internal combustion engines is an operation routinely carried out in garages and other vehicle servicing places. This operation may be regular or occasional because a malfunction is suspected or proven and a diagnosis is necessary before a possible repair.

The maintenance operation necessitates monitoring the electrical and hydraulic characteristics of the actuators and of the high pressure pump such as measuring the electrical resistance of the actuators and the pressure generated in the hydraulic circuit. Moreover, the hydraulic test for diagnosing the injection system or components of the system is not possible directly on the vehicle for the pressure range between 0 and 2850 bar inclusive with peaks at 3000 bar. A test of the operation under pressure of the components of the injection system is possible and necessitates removal of the actuators and the high pressure pump from the vehicle, that is to say demounting them and testing them on a test bench in order to verify their operation. The various manipulations by the operative to verify the functionality of the actuators out of the vehicle are time consuming and therefore costly.

At present a maintenance operative carries out the electrical measurements by means of a standard multimeter.

Among other problems encountered during the normal life of a vehicle, some actuators are partially obstructed by "lacquer", that is to say by a deposit of residue.

At present there exists no means for easily cleaning blocked or commonly referred to as "lacquered" actuators.

It is therefore apparent that a serious market demand, in particular from vehicle maintenance professionals, is to have available reliable and easy to use means enabling accurate execution of the necessary checks and the cleaning operations. Moreover, professionals maintain different types of injection systems and it would be inconceivable to duplicate the maintenance tools each time that a new system comes to market. A single and adaptable system is therefore needed. The object of the present invention is to provide a solution that resolves the above disadvantages.

SUMMARY OF THE INVENTION

The present invention solves the problems referred to above by proposing a maintenance system for a fuel injection system equipping an internal combustion engine. The fuel injection system defines a hydraulic circuit including a high pressure pump, a solenoid valve, a pressure sensor, a metering solenoid valve, a common rail and injectors. The maintenance system includes a manual control unit connected to a hydraulic unit. The hydraulic unit may be inserted into the hydraulic circuit of the fuel injection system. The hydraulic unit includes a test solenoid valve and a test pressure sensor mounted in a body having an inlet port, an outlet port and a leakage port. In use the test solenoid valve generates an artificial leak between a minimum fuel leakage volume and a maximum leakage volume inclusive. In use the test pressure sensor measures the pressure in the body of the hydraulic unit and generates a signal indicating the read pressure value, said signal being sent to the manual control unit.

The manual control unit includes a control box, at least three electric cables each terminated by a specific connector adapted to be connected to the solenoid valve of the injection system and to the metering solenoid valve of the injection system. The maintenance system measures the electrical resistances of the solenoid valve and the metering solenoid valve.

Moreover, the manual control unit is adapted to execute a plurality of operations in accordance with a measurement cycle that includes electrical measurements and hydraulic measurements. The selected measurement cycle is interrupted at the end of each of the operations of the measurement cycle, the next operation being triggered by action on a button of the control box so that the selected measurement cycle can be interrupted as soon as a measurement has enabled identification of a fault of the fuel injection system.

Moreover, the maintenance system is mobile and can be carried in one hand, easily manipulated and easily usable so as to be taken by an operative to near a vehicle the fuel injection system of which has to be verified.

Moreover, a specific adapter is connected to the end of the inlet port or the outlet port of the body. The specific adapter can be disconnected and replaced by another adapter specific to another actuator or to another high pressure pump so that the same control unit can be used to maintain a plurality of fuel injection systems.

Moreover, a maintenance kit of the fuel injection system controlled by a manual control unit is designed to equip diesel or petrol engines. The kit includes a maintenance system and at least one supplementary specific adapter so that the control unit can be used with a least two different models of the fuel injection system.

Moreover, the maintenance kit further includes a cleaning kit using a cleaning fluid, at least two syringes, a support adapted to be disposed in a complementary manner on the metering solenoid valve.

A method of using the system for maintaining a fuel injection system equipping an internal combustion engine controlled by the manual control unit, includes the steps of:
  connecting the manual control unit to the hydraulic unit, to the high pressure pump and to the actuators and to the pressure sensor of the fuel injection system;
  carrying out the electrical measurement of the solenoid valve and of the metering solenoid valve,
  measuring the pressure of the high pressure pump and measuring the flow rate and the pressure of the fuel injection system. The steps are strung together in accordance with a particular measurement cycle, the fuel injection system remaining in place on the internal combustion engine. The method of using the maintenance system described further includes a step of cleaning the metering solenoid valve during which the cleaning fluid circulates in the metering solenoid valve.

BRIEF DESCRIPTION OF THE DRAWINGS

Other features, aims and advantages of the invention will become apparent on reading the following detailed description with reference to the appended figures provided by way of nonlimiting example.

DESCRIPTION OF PREFERRED EMBODIMENTS

Figure 1:
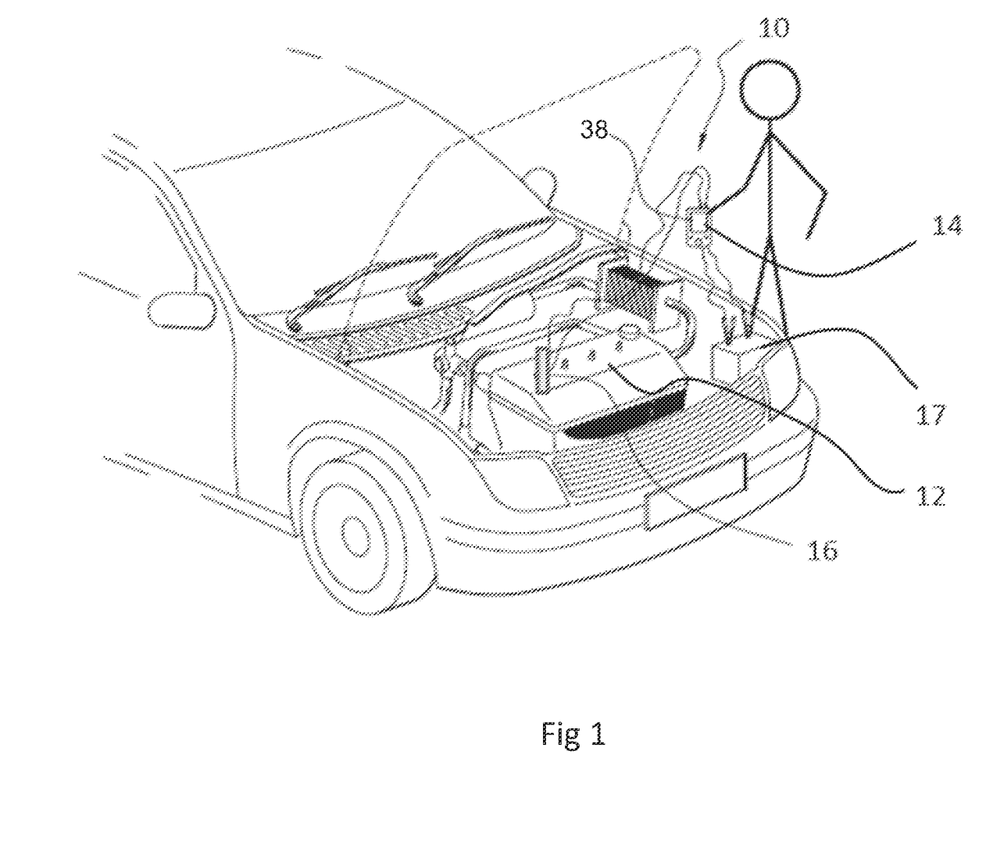
FIG. 1 is a view representing a maintenance system for diagnosing and analyzing faults of a fuel injection system during use by an operative.

The invention is described next with reference to the appended figures. FIG. 1 diagrammatically represents an operative using a maintenance system 10 to carry out maintenance operations on a fuel injection system 12 of a vehicle internal combustion engine. The maintenance system 10 includes a manual control unit 14 connected to a hydraulic unit 16. The control unit 14 is a portable device. The control unit 14 may be held in the hand by the operative or placed on the vehicle, the fuel injection system 12 being in place on the engine. The control unit 14 is electrically supplied with power by an external battery 17 that may be the battery 17 of the vehicle.

Figure 2:
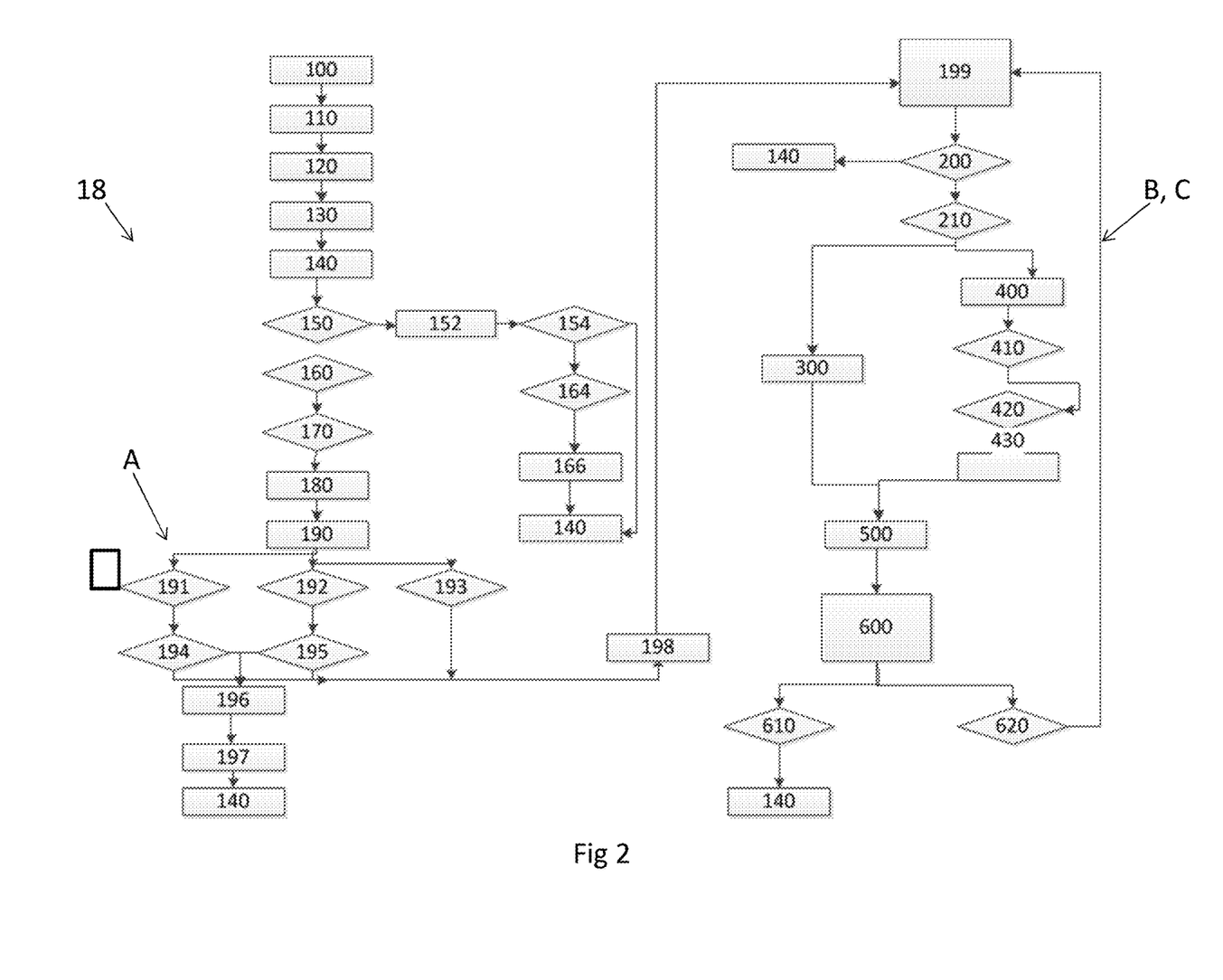
FIG. 2 is a flowchart of the steps of a measurement cycle executed by the maintenance system.
Figure 3:
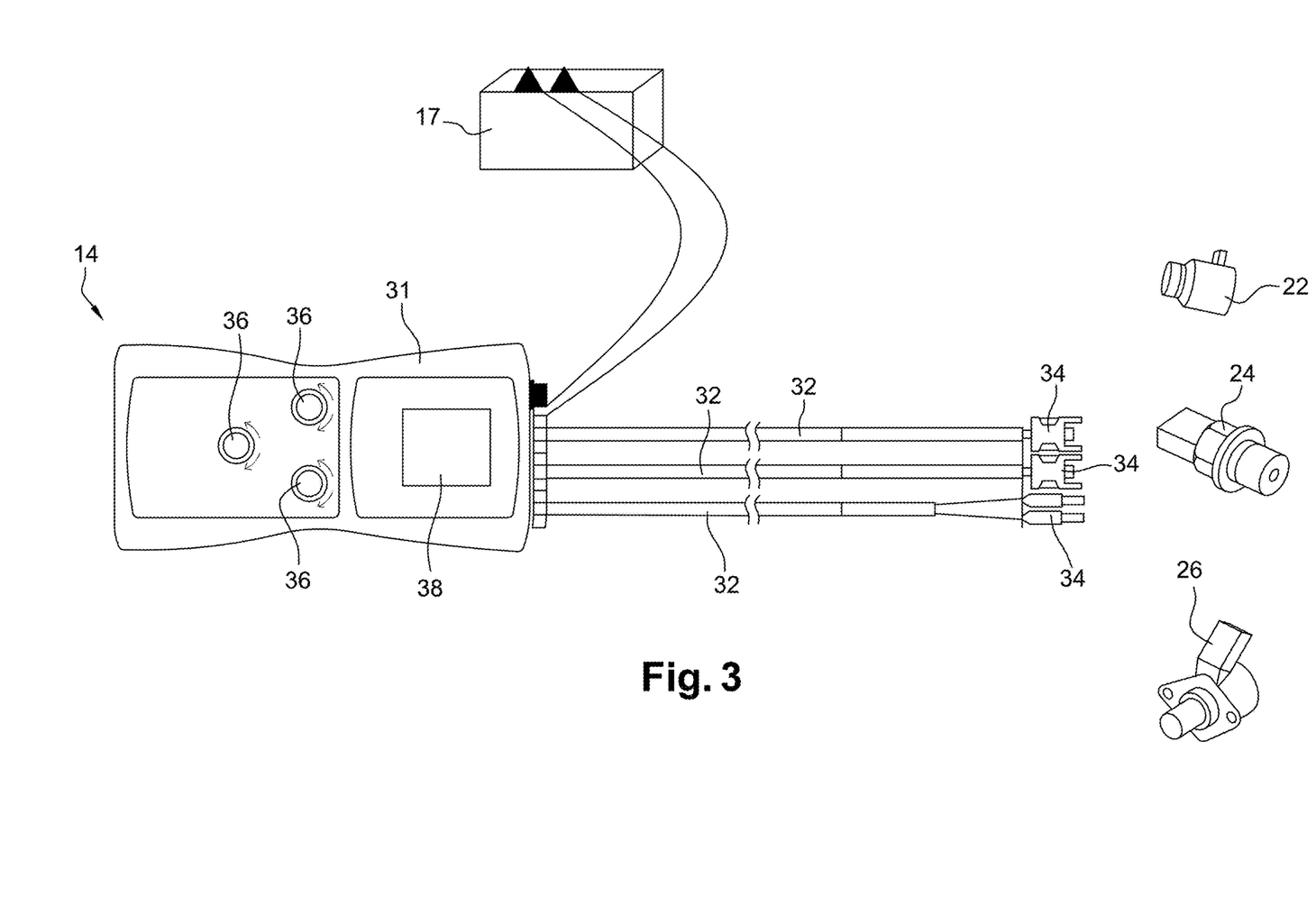
FIG. 3 is a view representing the circuit used for the actuator electrical measurements carried out by the maintenance system.
Figure 4:
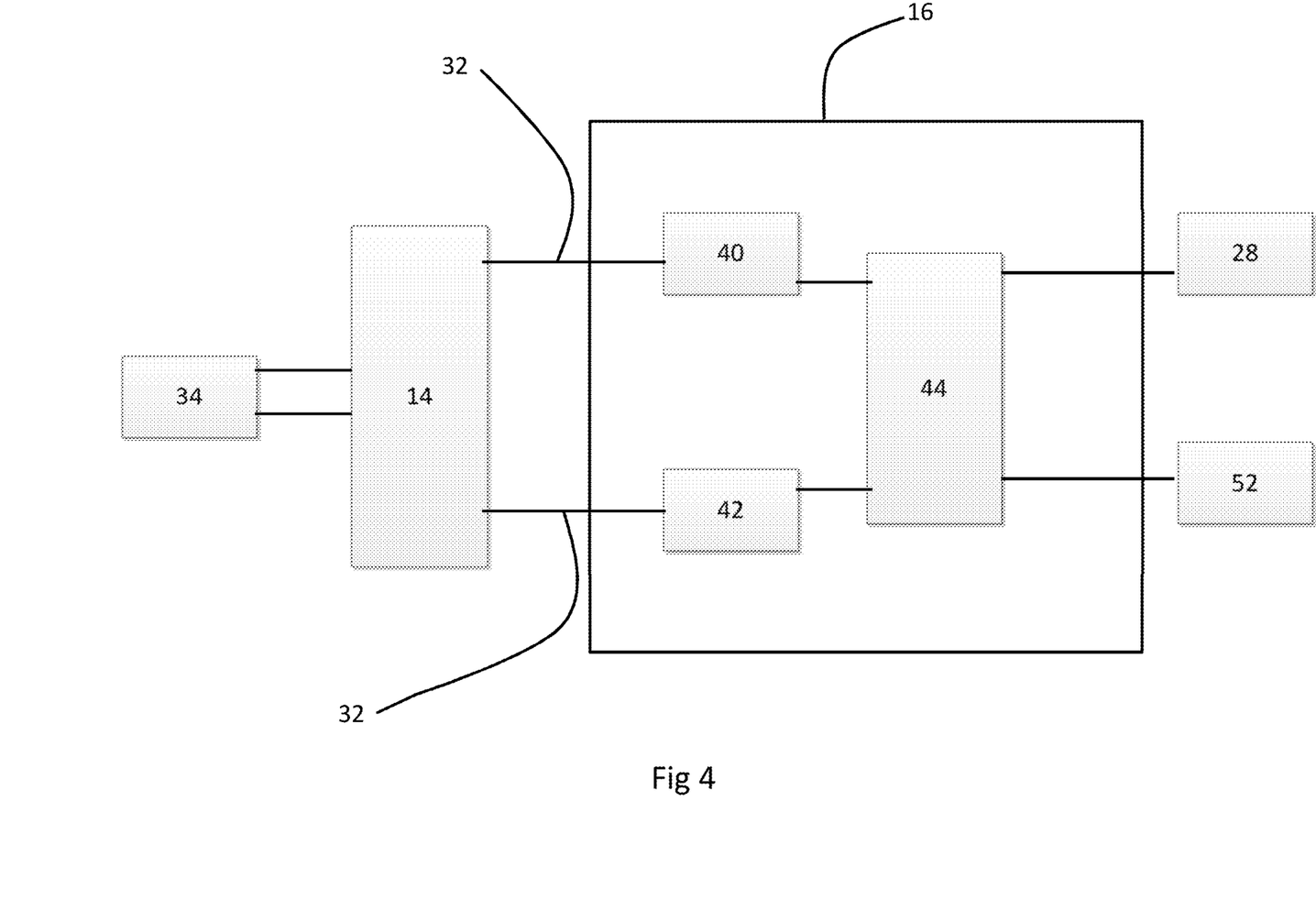
FIG. 4 is a functional diagram of the high pressure pump pressure measurement.
Figure 7:
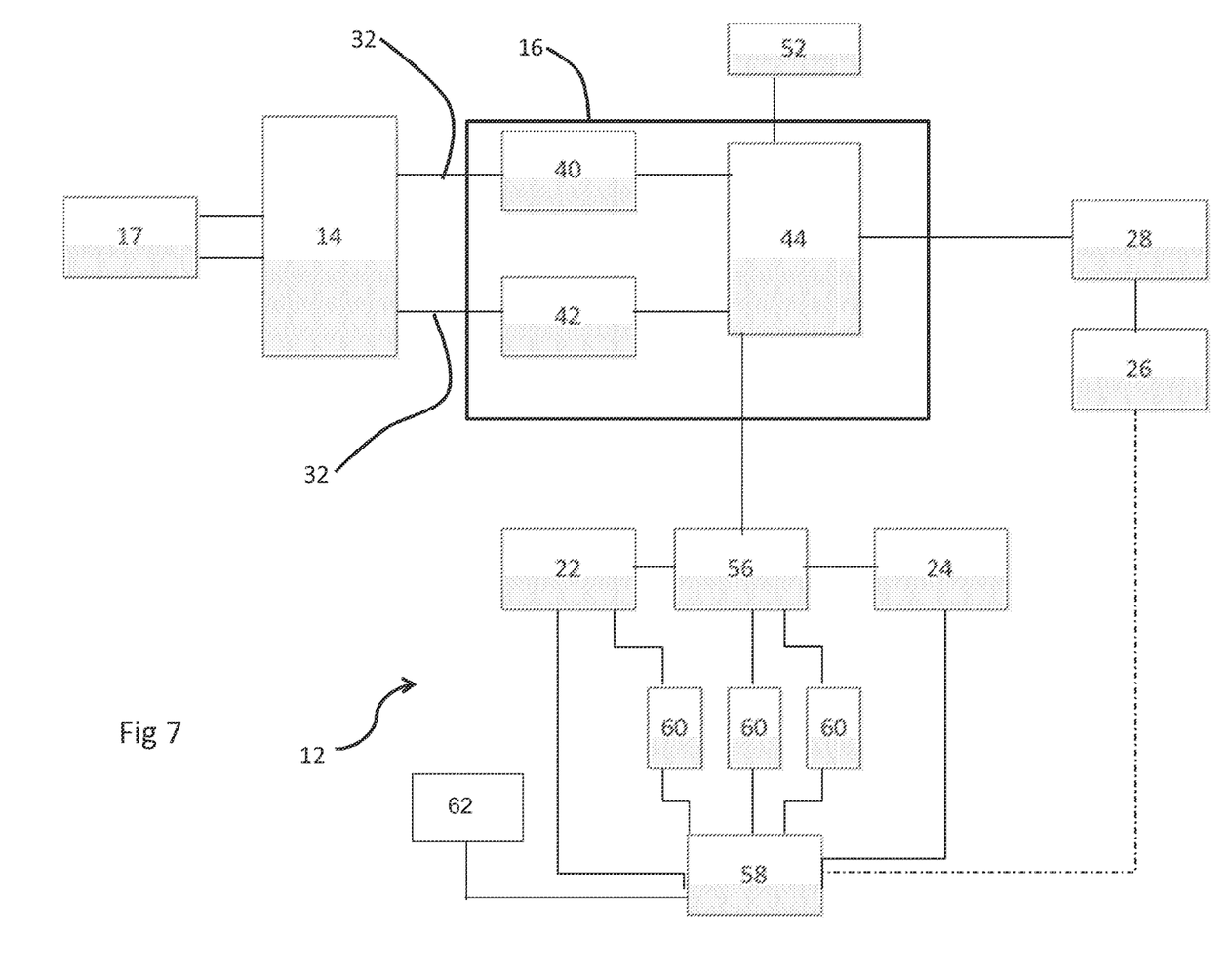
FIG. 7 is a functional schematic showing measurement of the flow rate and pressure of a type A fuel injection system.
Figure 8:
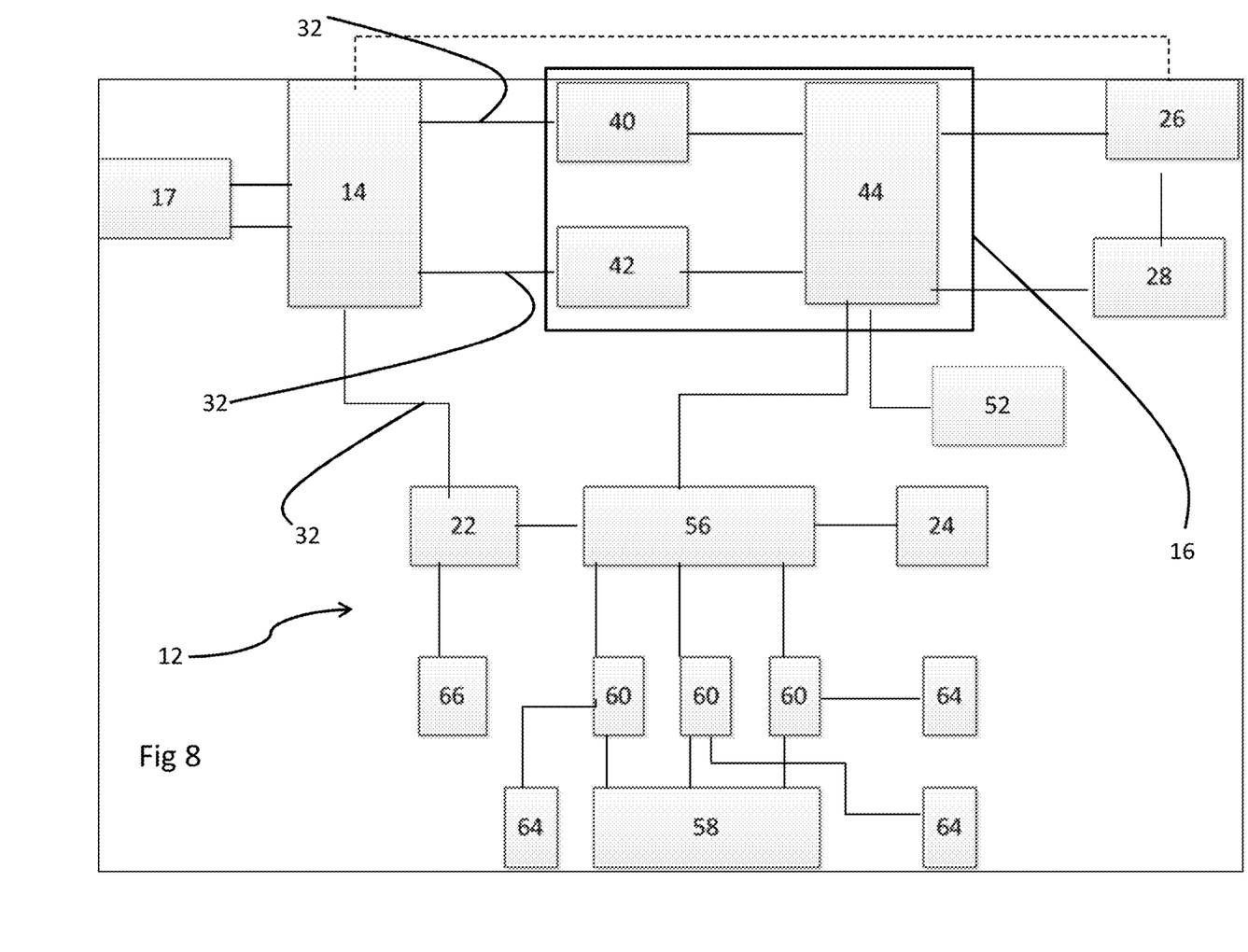
FIG. 8 is a functional schematic showing measurement of the flow rate and pressure of a type B fuel injection system.

FIG. 2 shows the flowchart that details the steps of a cycle 18 of electrical and hydraulic measurements that are stored. As shown in FIG. 1, the steps of the measurement cycle 18 may be executed by the control unit 14. Each measurement step of the measurement cycle 18 necessitates a specific branch connection that will be described in detail hereinafter. The flowchart of the measurement cycle 18 breaks down into three major measurement steps, which are:

A) as shown in FIG. 3, carrying out an electrical measurement of the actuators of the injection system that consist of a high pressure solenoid valve 22 also referred to as the solenoid valve 22, a pressure sensor 24 and a high pressure metering solenoid valve 26 also referred to as the metering solenoid valve 26, B) as shown in FIG. 4, carrying out a hydraulic pressure measurement of a high pressure pump 28, C) as shown in FIGS. 7 and 8, measuring the flow rate and the hydraulic pressure of the solenoid valve 22, of the pressure sensor 24 and of the metering solenoid valve 26 of the injection system 12. The steps B and C may be executed consecutively by starting with the step B followed by the step C or the operative chooses one of the two steps B, C and the order of execution of the steps B and C.

In an alternative to the measurement cycle 18 that is not represented in the FIG. 2 flowchart, the measurements cycle 18 may incorporate a step of cleaning the metering solenoid valve 26 if the metering solenoid valve 26 is "lacquered", which means that the metering solenoid valve 26 is soiled.

The detail of the flowchart of the measurement cycle 18 in FIG. 2 will now be described with the aid of FIGS. 3 to 8:

100: power up the control unit 14,
110: display the start menu on a screen 38 of the control unit 14,
120: measure the voltage at the terminals of the control unit 14,
130: wait 2 seconds,
140: return to the main menu displayed on the screen 38 of the control unit 14,
150: choose the sound selection menu,
152: display the "sound" menu,
154: choose to activate or deactivate Sound,
160: choose the menu language selection menu,
162: display the available languages menu,
164: choose a different language,
166: load the menus with the new language chosen,
140: return to the main menu on the screen 38 of the control unit,
170: choose the start menu,
180: display "Verification of connections" on the screen 38,
190: display "Verification of connection and resistance" on the screen 38,
191: verify the connection of the metering solenoid valve 26,
192: verify the connection of the solenoid valve 22,
193: verify the connection of the pressure sensor 24,
194: verify the electrical resistance of the winding of the solenoid valve 22,
195: verify the electrical resistance of the winding of the metering solenoid valve 26,
196: display the Winding fault on the screen 38,
197: emit a "beep" representing the winding fault,
140: Return to the main menu on the screen 38 of the control unit,
198: emit a "beep" representing correct electrical operation of the actuators 22, 26 and the pressure sensor 24,
199: display the results of the verifications of the connection of the actuators 22, 24, 26 and the electrical resistance values of the actuators 22, 26 as a function of the adjustments of the actuators 22, 26,
200: display "Cancel" on the screen 38 to indicate the possibility of the operative canceling the measurement cycle,
140: return to the main menu on the screen 38 of the control unit,
210: display "Start" on the screen 38 to indicate that the next cycle may be started by the operative,
300: display the result of the pressure measurement carried out by the pressure sensor 24 and the adjustments that the operative will set as a percentage of the maximum pressure of the actuators 22, 26 in order for the control unit 14 to send the command to the actuators 22, 26,
400: activate the PWM signal with the aid of the control box 31 of the control unit 14, 410: activate one of the buttons 36 of the control unit 14 in accordance with the menus displayed,
420: display the time of the PWM signal that is already preset,
430: stop the PWM signal,
500: emit a "beep",
600: end of measurement: display the pressure read on the screen 38 of the control box 31 by the pressure sensor 24 and the values as percentages of the maximum operating pressure of the actuators 22, 26 chosen by the operative,
610: select "Cancel" on the information screen 38,
620: select "Resume" on the information screen 38,
140: return to the main menu on the screen 38 of the control unit.

The flowchart of the measurement cycle 18 will be described for each measurement according to the operation to be carried out by the operative.

As shown in FIG. 3, step A corresponds to the electrical measurement 20 of the actuators 22, 26 and of the pressure sensor 24 of the injection system. Step A corresponds to the steps between step 180 and step 199 inclusive from FIG. 2. The objective of step A is to verify that the electrical characteristics of the actuators 22, 26 of the fuel injection system conform to the values expected by the operative. The first measurement step of the measurement cycle 18 is an electrical measurement 20. The manual control unit 14 includes a control box 31, at least three electrical cables 32 each terminated by a connector 34 specific to each actuator 22, 26 and to the pressure sensor 24. The control unit 14 is connected to the battery 17 of the vehicle and the control unit 14 verifies the voltage at its terminals. The control box 31 includes buttons 36 and the display screen 38. The operative connects the connectors 34 of the control unit 14 to the solenoid valve 22, to the pressure sensor 24 and to the metering solenoid valve 22 if present. The solenoid valve 22 is also commonly referred to as the high pressure valve (HPV) 22. The pressure sensor 24 is also commonly referred to as the high pressure sensor (HPS) 24. The metering solenoid valve 26 is also commonly referred to as the inlet metering valve (IMV) 26. The electrical measurement 18 consists in verification of the connections of the actuators 22, 24, 26 and measurement 18 of the electrical resistance. This electrical resistance measurement will enable adjustment of PWM control according to the electrical characteristic of the actuator 22, 26. First of all the operative selects "Connection and resistance" in the menu displayed on the screen 38, which corresponds to steps 180 to 199 of the FIG. 2 flowchart. The control unit 14 verifies that the actuators 22, 26 and the pressure sensor 24 are indeed connected. If everything is properly connected the operative will then press on one of the buttons 36 to start the measurement of the electrical resistances of the solenoid valve 22 and of the metering solenoid valve 26. The electrical measurements 18 are read directly on the screen 38 of the control box. If the electrical resistance 20 is out of tolerance, that is to say outside the measurement range between a minimum value and a maximum value of the electrical resistance of the actuators 22, 26 of the fuel injection system to be repaired, the screen 38 displays a fault message on the screen 38 of the control box 31. If the electrical resistance 20 is in the tolerance range of the electrical resistance 20 of the actuator 22, 26 of the fuel injection system then the operative can move on to the next step, that is to say to step B of measuring the pressure of the high pressure pump 28 or step C of measuring the flow rate and the pressure of the injection system.

Figure 5:
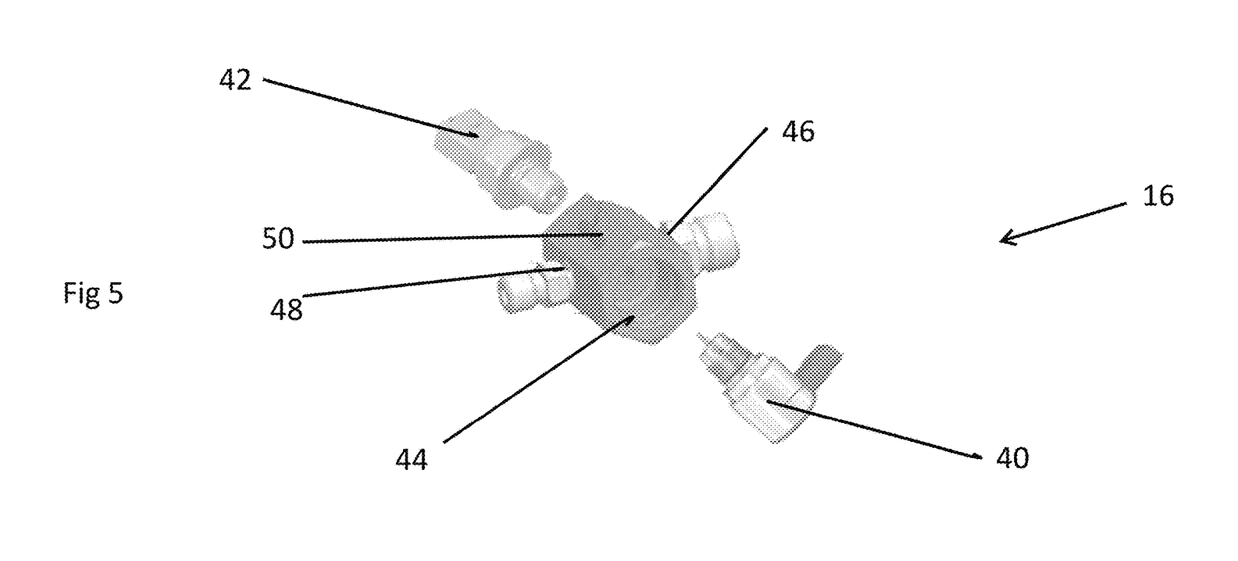
FIG. 5 is an exploded view of the hydraulic unit of the maintenance system.
Figure 6:
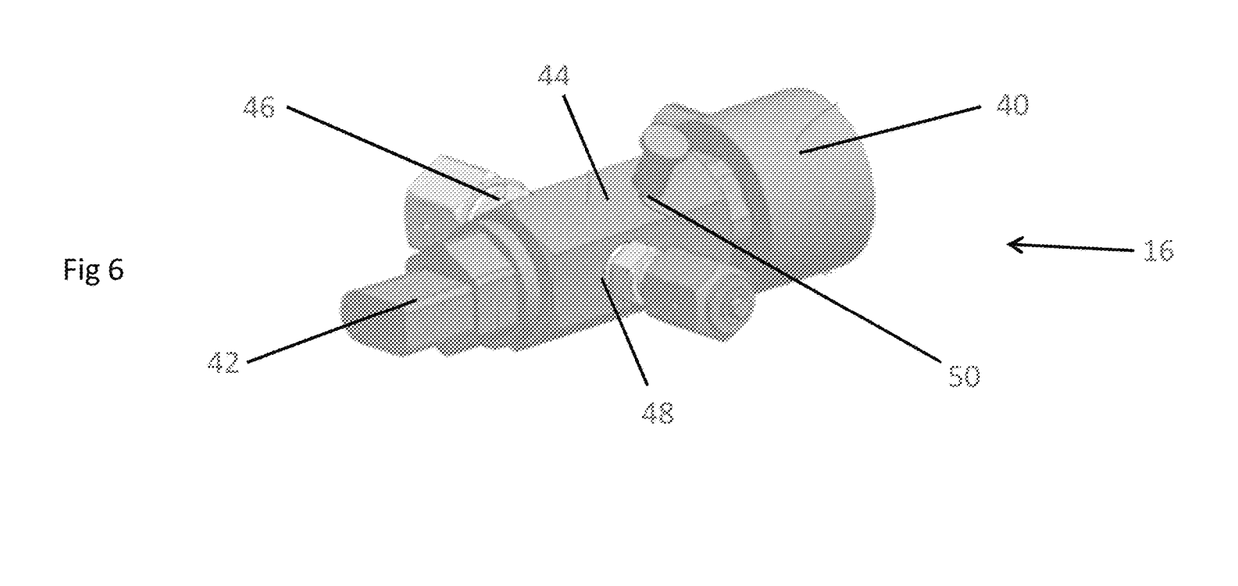
FIG. 6 is a perspective view of the hydraulic unit of the maintenance system.

Step B as represented in FIGS. 4, 5 and 6 will now be described. Step B corresponds to measuring the pressure of the high pressure pump 28. Step B corresponds to the steps between step 210 and step 600 inclusive from FIG. 2. Step B corresponds to measuring the pressure of the high pressure pump 28 that is carried out using the control unit 14 and the hydraulic unit 16 of the maintenance system 10. The objective of this hydraulic pressure measurement is to verify the functionality of the high pressure pump 28. As shown in FIG. 4, the functional schematic of the pressure measurement includes the control unit 14 that is connected to the hydraulic unit 16 and to a voltage source, here the battery 17 of the vehicle. As represented in FIGS. 4, 5 and 6, the hydraulic unit 16 includes a test solenoid valve 40 and a test pressure sensor 42 mounted in a body 44 provided with an inlet port 46 that includes an M20x1.5 type high pressure connector, an outlet port 48 that includes an M14x1.5 high pressure connector and a leakage port 50 that may include a canula. Depending on the petrol or diesel fuel injection system, the inlet port 46 and the outlet port 48 may necessitate a specific adapter 68 to be connected to a specific input of the high pressure pump 28. The outlet port 48 is closed in step B. The hydraulic unit 16 is connected to a fuel container 52 connected by a first tube to the canula that is mounted on the leakage port 50. The hydraulic unit 16 is hydraulically connected to the high pressure pump 28 by a second tube to the inlet port 46 of the body. The test solenoid valve 40 and the test pressure sensor 42 are electrically connected to the control unit 14. The pressure measurement step B will now be described in more detail. The measurement of the pressure of the high pressure pump 28 proceeds in the following manner:

b10) electrically connect the control unit 14 to a voltage source, for example the battery 17 of the vehicle,
b20) connect the fuel container 52 to the leakage port 50 by means of the first tube and a canula,
b30) electrically connect the control unit 14 to the test solenoid valve 40 and to the test pressure sensor 42,
b40) activate the starter of the vehicle to be verified for approximately 5 seconds to generate the pressure from the high pressure pump 28,
b50) using the button 36 on the control box set a hydraulic pressure setpoint to be reached, which is displayed on the screen 38 and generates a current for activating the winding of the test solenoid valve 40, the test solenoid valve 40 generating a leak of fuel into the body 44 that is recovered in the fuel container 52,
b60) read off the hydraulic pressure threshold reached on the screen 38 of the control unit 14, the hydraulic pressure being measured in the body 44 by the test pressure sensor 42,
b70) stop the measurement of the pressure of the high pressure pump 28,
b80) read off the hydraulic pressure threshold on the screen 38.

The result of the measurement consists of two characteristics that are analyzed by the operative:
the hydraulic pressure read off on the screen 38 in step b60 of the pressure measurement,
the presence of a volume of recovered fuel in the fuel container 52 in step b80 confirms the capacity excess of the high pressure pump 28.

If the pressure read off in step b60 does not correspond to the pressure threshold set by the operative in step b50 then the high pressure pump 28 is defective. The operative changes the defective high pressure pump 28 for a new, functional high pressure pump 28 in good condition. If the pressure read off in step b60 corresponds to the pressure threshold set by the operative in step b50 then the high pressure pump 28 is functional. The operative can then continue the measurement cycle 18 and move onto step C, which is the flow rate and pressure measurement step.

As represented and described in FIGS. 7 and 8, step C corresponds to the in situ measurement in the vehicle of the flow rate and the pressure of the solenoid valve 22, the pressure sensor 24 and the metering solenoid 26 if present in the fuel injection system 12. Step C corresponds to the steps between step 210 and step 600 inclusive from FIG. 2, those steps being similar to step B. The flow rate is measured by measuring the volume of fuel recovered in a defined time by the maintenance system at different locations of the injection system, as described hereinafter.

As represented in FIG. 7, the functional schematic of the flow rate and pressure measurement concerns injection systems of type A. Type A corresponds to an injection system that uses a diagnostic tool 62 connected to a computer 58.

As represented in FIG. 7, step C corresponds to measuring the flow rate and hydraulic pressure of the fuel injection system 12 using the control unit 14 and the hydraulic unit 16 of the maintenance system 10. The hydraulic unit 16 of the maintenance system is inserted between the high pressure pump 28 and the inlet of the common rail 56 of the fuel injection system 12. The objective of the step C measurement is to verify if the actuators 22, 26 and the pressure sensor 24 of the fuel system 12 are functional. The hydraulic unit 16 includes the body 44 on which the test solenoid valve 40 and the test pressure sensor 42 are mounted. The body 44 of the hydraulic unit is connected by the canula and by the first tube to the fuel container 52. The body 44 is hydraulically connected to the high pressure pump 28 by the second tube. The control unit 14 is electrically connected by the cable 32 to the test solenoid valve 40 and to the test pressure sensor 42. Moreover, depending on the petrol or diesel fuel injection system, the inlet port 46 and the outlet port 48 of the body 44 may necessitate the specific adapter 68 to be connected either to a specific input of the high pressure pump 28 or to an inlet of the common rail 56. As described in FIG. 7 the computer 58 of the fuel injection system 10 is electrically connected to the solenoid valve 22, to the pressure sensor 24, to the injectors 60 of the fuel injection system 10 and to the metering solenoid valve 26 if present in the high pressure pump 28.

The flow rate and hydraulic pressure measurement step C for type A fuel injection systems will be described in more detail. The flow rate and pressure measurement proceeds in the following manner:
  c10) connect the diagnostic tool 62, also referred to as the onboard diagnostic (OBD) tool, and verify if there are fault codes stored in the computer 58, also referred to as the "electronic control unit" (ECU), of the fuel injection system 12. If faults are displayed then the operative will replace the actuator 22, 26 or the two defective actuators 22, 26 identified by the diagnostic tool 62.
  c20) Activate via the diagnostic tool 62 the so called "Pump capacity" operating cycle present in the computer 58; during this operating cycle the engine of the vehicle is idling and the computer 58 then controls the actuators 22, 26, the pressure sensor 24 and the injectors 60,
  c30) set the hydraulic pressure set point to be reached with the aid of the control box 31 of the control unit 14 of the maintenance system 10 during a period defined by the "Pump capacity" cycle of the diagnostic tool 62, the cycle ending with stopping the engine of the vehicle,
  c40) read off the pressure displayed on the screen 38, which is the value of the pressure measured by the test pressure sensor 42 and sent to the control unit 14,
  c50) collect and read off the volume of fuel recovered in the fuel container 52.

The result of the step C flow rate and hydraulic measurement consists of two characteristics that are analyzed by the operative:
  the hydraulic pressure read off on the screen 38 in step c60,
  the volume of fuel recovered in the fuel container 52 in step c50.

If the pressure source, that is to say the high pressure pump 28, does not compensate the artificial leak generated by the control unit 14 by opening the test solenoid valve 40 then that will mean that the fault stems from the pressure source and therefore the high pressure pump 28, the solenoid valve 22 or the injectors 60 that allow fuel to return to the fuel tank of the vehicle. In concrete terms, in the latter case the pressure that is read off on the screen 38 is lower than the pressure value set by the operative using the manual control unit 14.

If moreover the volume collected in the fuel container 52 during the "Pump capacity" cycle controlled by the computer 58 and activated by the diagnostic tool 62 is less than the tolerance range of the known value of the volume for the fuel injection system 12, then it is the fuel injection system 62 that is under capacity.

If on the other hand the volume recovered in the fuel container 52 is in the expected fuel volume tolerance range but the pressure read off is less than the value of the pressure set by the control unit 14, that means that the solenoid valve 22 or the injectors 60 or both the solenoid 22 and one of the injectors 60 are faulty.

As represented in FIG. 8, the functional schematic of the flow rate and pressure measurement concerns type B fuel injection systems. Type B corresponds to injection systems that are not type A injection systems, that is to say injection systems that do not use the diagnostic tool 62. As represented in FIG. 8 step C corresponds to the measurement of the flow rate and hydraulic pressure of the fuel injection system 12 carried out using the control unit 14 and the hydraulic unit 16 of the maintenance system 10. The hydraulic unit 16 of the maintenance system 10 is inserted between the high pressure pump 28 and the inlet of the common rail 56 of the fuel injection system 12. The objective of the step C measurement is to verify if the actuators 22, 26 of the fuel system 12 are functional.

The hydraulic unit 16 includes the body 44 on which the test solenoid valve 40 and the test pressure sensor 42 are mounted. The body 44 of the hydraulic unit is connected by the first tube and the canula to the fuel container 52. The body 44 is hydraulically connected to the high pressure pump 28 by the second tube. The control unit 14 is electrically connected by a cable to the test solenoid valve 40, to the test pressure sensor 42, to the solenoid valve 22 and to the metering solenoid valve 26 if present in the fuel injection system. As described in FIG. 8 the computer 58 of the fuel injection system 12 is electrically connected to the pressure sensor 24 and to the injectors 60 of the fuel injection system 12. Each injector 60 is connected to a fuel container 64 and the solenoid valve 22 is connected to a fuel container 66.

The flow rate and hydraulic pressure measurement step C for type B fuel injection systems will be described in more detail. The flow rate and pressure measurement proceeds in the following manner:

c100) connect the manual control unit 14 to the test solenoid valve 40, to the test pressure sensor 42, to the solenoid valve 22 and to the metering solenoid valve 26, c110) leave the computer 58 connected to the injectors 60 and to the pressure sensor 24, c120) connect the test solenoid valve 40 to a fuel container 52 by means of the first tube, each injector 60 to a fuel container 62 by means of third tube and the solenoid 22 to a fuel container 64 by means of a fourth tube, c130) set a hydraulic pressure to be reached using the control unit 14 which takes over from the computer 58 which goes to a fault mode, that is to say a reduced flow rate mode, and the solenoid valve 22 will therefore be forced to close by the control unit 14, c140) read off the pressure displayed on the screen 38 of the control box 31, which is the pressure value sent to the control unit 14 by the test pressure sensor 42, c150) collect and read off the volume of fuel recovered in the containers 52, 62, 64.

The result of the step C flow rate and hydraulic pressure measurement consists of two characteristics that are analyzed by the operative:

the hydraulic pressure read off on the screen 38 in step c60, the volume of fuel recovered in the fuel containers 52, 62, 64 in step c70.

If the hydraulic pressure setpoint sent by the control unit 14 to the hydraulic unit 16 is not reached or is not regulated by the test solenoid valve 40 then the fuel injection system 12 has a fault in the high pressure pump 28, the solenoid valve 22 or the metering solenoid valve 26 of the pump if present. If the volume collected in the fuel container 52 of the test solenoid valve 40 is less than the known value expected for the pressure value set by the operative then that means that the fuel injection system 12 is undercapacity. The operative then analyzes the values of the volumes of fuel measured in the containers 62, 64. If there are measured recovered fuel volume values that are greater than the values expected for the solenoid valve 22 or for the injectors 60 or both for the solenoid valve 22 and the injectors 60, that means that the solenoid valve 22 or the injectors 60 or both are consuming more than the expected value for the solenoid valve 22 or for the injectors 60 or both for the solenoid valve 22 and the injectors 60. This indicates a fault that the operative will repair.

In some configurations of the fuel injection system 12 the hydraulic unit 16 may be such that the flow of fuel arrives via the outlet port 48 and leaves via the inlet port 46. The operation of the hydraulic unit 16 in the measurement cycle 18 of the maintenance system 10 remains exactly the same.

Figure 9:
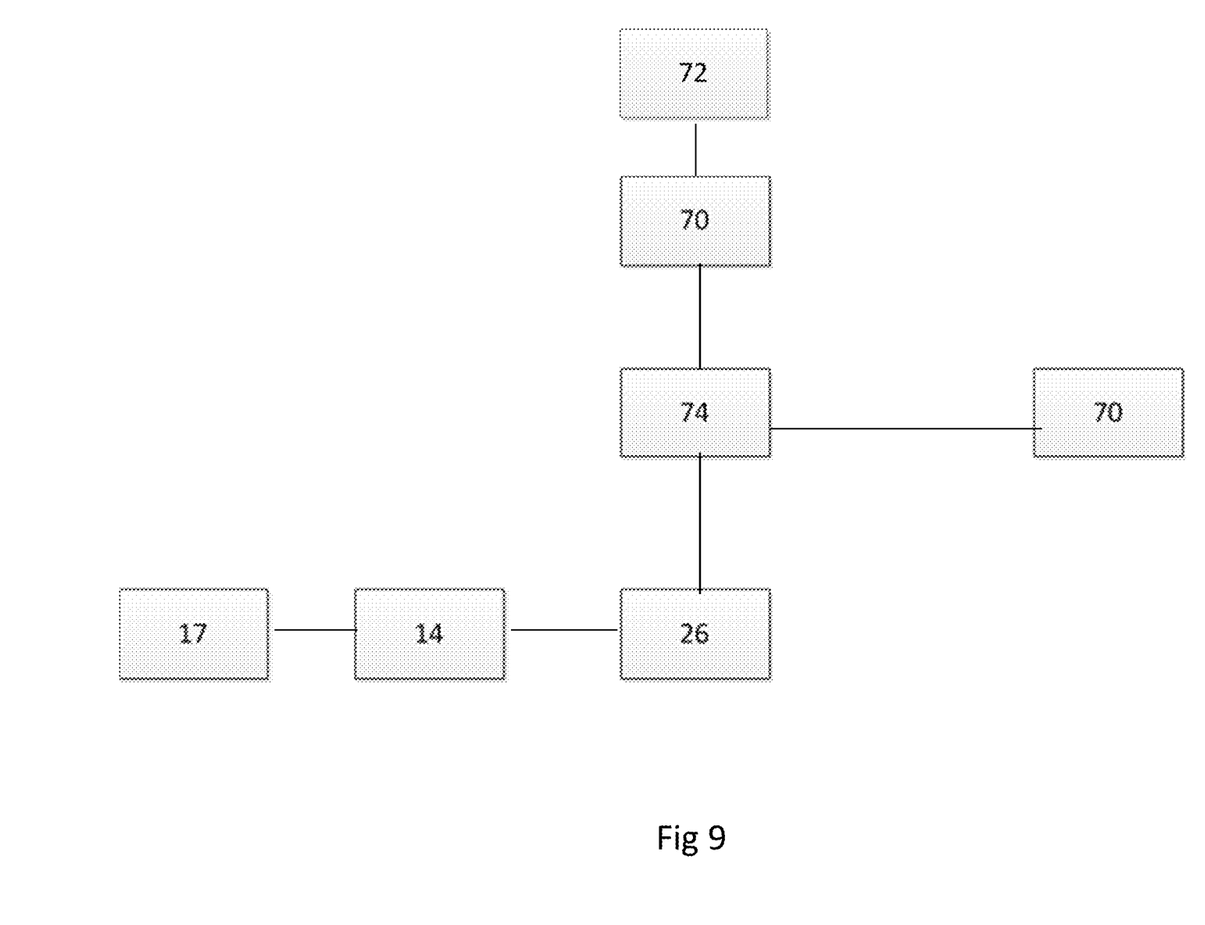
FIG. 9 is a functional diagram of a metering solenoid valve cleaning operation.
Figure 10:
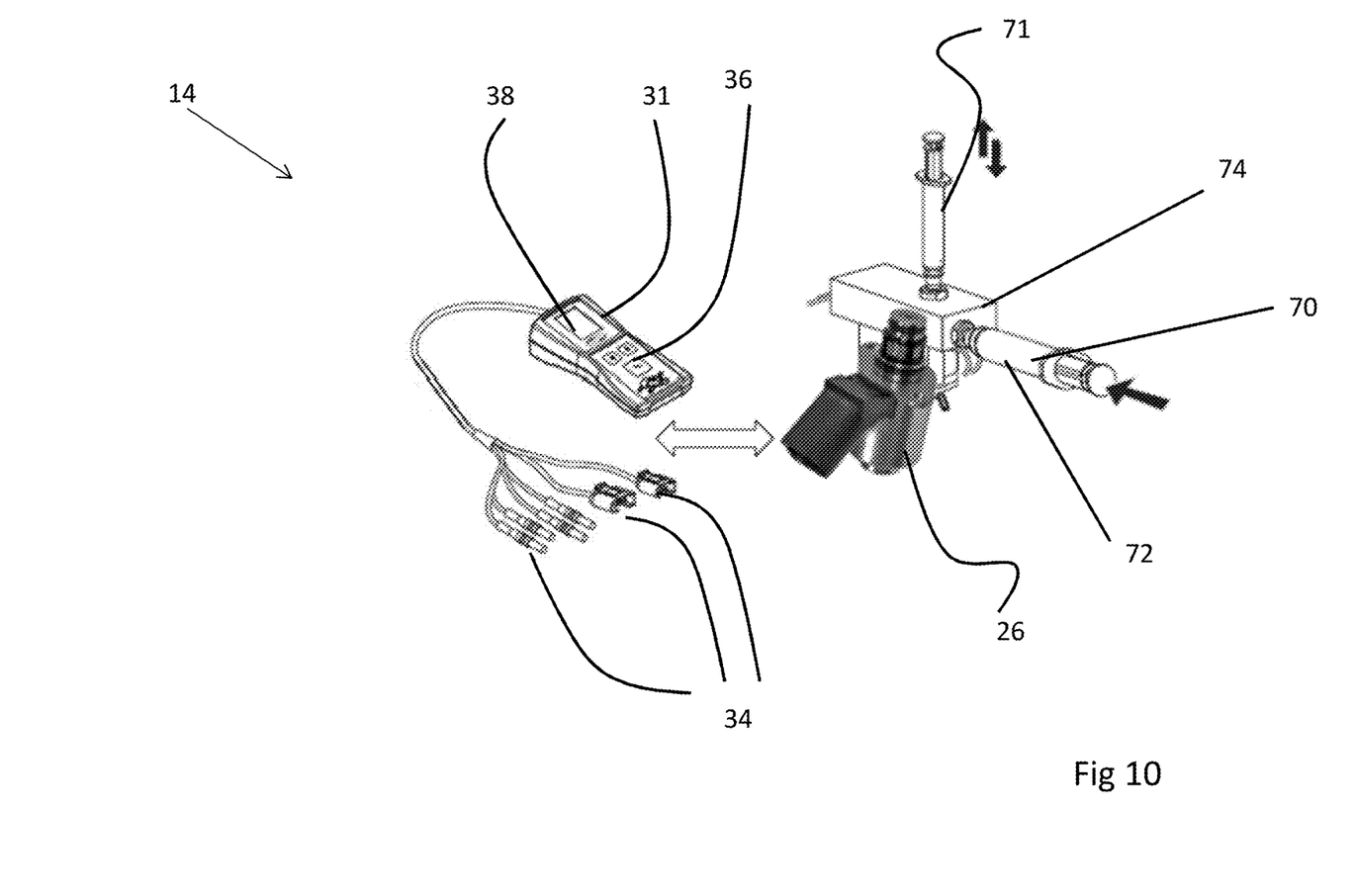
FIG. 10 is a view of the metering solenoid valve cleaning system.

The measurement cycle 18 block diagram as described in FIG. 2 has no cleaning step. That step is an optional step that may be carried out as soon as defective operation of the metering solenoid valve 26 is detected. FIGS. 9 and 10 represent the functional schematic and the components of the cleaning system. The cleaning step proceeds in the following manner:

d10) demount the metering solenoid valve 26 from the fuel injection system 12 and then position it on and fix it to the base 74, d20) inject a cleaning solvent 72 into a first syringe 70, d30) connect the metering solenoid valve 26 to the control unit 14 and select the "Cleaning" mode on the screen 38 in order to activate the piston of the metering solenoid valve 26 in bursts, d40) purge the metering solenoid valve 26 using the first syringe 70 containing the cleaning solvent 72, d50) leave the cleaning solvent 72 to act in the metering solenoid valve 26 for 20 to 40 minutes, d60) purge the metering solenoid valve 26 again using the cleaning solvent 72, d70) activate the piston of the metering solenoid valve 26 using the control unit 14 and verify that the piston sliding in the chamber of the metering solenoid valve 26 does not emit a shrill noise; the cleaning solvent 72 is discharged into a second syringe 71, d80) purge the metering solenoid valve 26 with an ISO4113 liquid, d80) demount the metering solenoid valve 26 from its base 74, d90) remount the metering solenoid valve 26 on the high pressure pump 28.

As described in FIGS. 9 and 10, the equipment set up for cleaning the metering solenoid valve 26 includes the control unit 14, the support 74, the first syringe 70, the second syringe 71 and the cleaning solvent 72. The set up is assembled in the following manner. First of all the operative demounts the metering solenoid valve 26 from the high pressure pump 28 for example. They then fix the metering solenoid valve 26 to a support 74. The operative will take the first syringe 70 containing the cleaning solvent 72 and fix it to an inlet port of the support 74. The operative will connect the control unit 14 to the metering solenoid valve 26 with the aid of a connector 34 specific to the metering solenoid valve 26. Activating the piston of the metering solenoid valve 26 will then discharge the cleaning solvent 72 into the second syringe 71.

During maintenance operations the operative uses a maintenance kit 76 that includes the control unit 14, the hydraulic unit 16 and at least one specific adapter 68. The term kit defines a set of spare parts constituting an object, sold with an assembly drawing, and that one assembles oneself. In our case this will be a maintenance kit for use by maintenance operatives. Moreover a cleaning kit 80 may also be added to the maintenance kit 76. The cleaning kit 80 includes the cleaning fluid 72, at least the two syringes 70, 71, the support 74 adapted to be arranged in a complementary manner on the metering solenoid valve 26.

The following references have been used in the description:

10 Maintenance system
12 Fuel injection system
14 Control unit
16 Hydraulic unit
17 Battery
18 Measurement cycle
20 Electrical measurement
22 Solenoid valve
24 Pressure sensor
26 Metering solenoid valve
28 High pressure pump
31 Control box
32 Electrical cable
34 Connector
36 Button
38 Screen
40 Test solenoid valve
42 Test pressure sensor 44 Hydraulic unit body
46 Body inlet port
48 Body outlet port
50 Body leakage port
52 Hydraulic unit fuel container
54 Starter of vehicle to be verified
56 Common rail
58 Computer or ECU
60 Injector
62 Onboard diagnosis (OBD) tool
64 Fuel container connected to an injector
66 Fuel container connected to solenoid valve
68 Specific adapter
70 First syringe
71 Second syringe
72 Cleaning fluid
74 Support
76 Maintenance kit
80 Cleaning kit
A Electrical measurement step
B Pressure measurement step
C Flow rate and pressure measurement step

The invention claimed is:

1. A maintenance system for a fuel injection system equipping an internal combustion engine, the fuel injection system defining a hydraulic circuit including a high-pressure pump, a solenoid valve, a pressure sensor, a metering solenoid valve, a common rail, and injectors, the maintenance system comprising:
a manual control unit connected to a hydraulic unit, the hydraulic unit being configured to be inserted into the hydraulic circuit of the fuel injection system and including a test solenoid valve and a test pressure sensor mounted in a body having an inlet port, an outlet port and a leakage port, wherein the test solenoid valve is configured to generate an artificial leak between a minimum fuel leakage volume and a maximum leakage volume inclusive, wherein the test pressure sensor is configured to measure a pressure in the body of the hydraulic unit, and wherein the test pressure sensor is also configured to generate and send a signal to the manual control unit which indicates the pressure in the body.

2. The maintenance system as claimed in claim 1, wherein the manual control unit includes a control box, at least three electric cables each terminated by a specific connector configured to be connected to the solenoid valve of the fuel injection system and to the metering solenoid valve of the fuel injection system, and wherein the maintenance system is configured to measure an electrical resistance of the solenoid valve and an electrical resistance of the metering solenoid valve.

3. The maintenance system as claimed in claim 2, wherein the manual control unit is configured to execute a plurality of operations in accordance with a measurement cycle that includes electrical measurements and hydraulic measurements.

4. The maintenance system as claimed in claim 3, wherein the manual control unit is configured to interrupt the measurement cycle at an end of each of the plurality of operations of the measurement cycle and wherein the control box is configured to trigger a next operation by action on a button of the control box, thereby interrupting the measurement cycle as soon as a measurement has enabled identification of a fault of the fuel injection system.

5. The maintenance system as claimed in claim 1, wherein the maintenance system is mobile, can be carried in one hand, and is easily manipulatable.

6. The maintenance system as claimed in claim 1, wherein a specific adapter is connected to an end of the inlet port or the outlet port of the body, the specific adapter being disconnectable and replaceable by another adapter specific to another actuator or to another high-pressure pump so that the control unit can be used to maintain a plurality of fuel injection systems.

7. The maintenance system as claimed in claim 6, further comprising at least one supplementary specific adapter so that the control unit can be used with a least two different models of the fuel injection systems.

8. The maintenance system as claimed in claim 7, further comprising a cleaning kit having a cleaning fluid, at least two syringes, and a support configured to be arranged in a complementary manner on the metering solenoid valve.

9. A method of using the maintenance system of claim 1, the method comprising steps of:
connecting the manual control unit to the hydraulic unit, to the high-pressure pump, to the solenoid valve, to the metering solenoid valve, and to the pressure sensor of the fuel injection system,
carrying out electrical measurements of the solenoid valve and the metering solenoid valve, and
measuring a pressure of the high-pressure pump and measuring a flow rate and a pressure of the fuel injection system,
wherein the steps are strung together in accordance with a particular measurement cycle and with the fuel injection system remaining in place on the internal combustion engine.

10. The method as claimed in claim 9 further comprising cleaning the metering solenoid valve during which a cleaning fluid circulates in the metering solenoid valve.

* * * * *